(12) United States Patent
Haas et al.

(10) Patent No.: US 6,603,549 B2
(45) Date of Patent: Aug. 5, 2003

(54) CONVOLUTION METHOD FOR MEASURING LASER BANDWIDTH

(75) Inventors: Steven F. Haas, Escondido, CA (US); Richard L. Sandstrom, Encinitas, CA (US); Thomas Hofmann, San Diego, CA (US); Alexander I. Ershov, San Diego, CA (US)

(73) Assignee: Cymer, Inc., San Diego, CA (US)

(*) Notice: Subject to any disclaimer, the term of this patent is extended or adjusted under 35 U.S.C. 154(b) by 85 days.

(21) Appl. No.: 09/931,726

(22) Filed: Aug. 16, 2001

(65) Prior Publication Data

US 2002/0122176 A1 Sep. 5, 2002

Related U.S. Application Data

(63) Continuation-in-part of application No. 09/513,324, filed on Feb. 25, 2000, now Pat. No. 6,320,663, and a continuation-in-part of application No. 09/737,181, filed on Dec. 14, 2000, now Pat. No. 6,359,693, and a continuation-in-part of application No. 09/772,293, filed on Jan. 29, 2001, now Pat. No. 6,480,275.

(51) Int. Cl.$^7$ ................................................. G01J 3/18
(52) U.S. Cl. ...................... 356/326; 356/328; 356/331; 356/454
(58) Field of Search ............................. 356/326, 328, 356/331, 454, 329, 330, 333, 451, 519; 372/108, 19, 57, 20, 102

(56) References Cited

U.S. PATENT DOCUMENTS

| | | | |
|---|---|---|---|
| 4,241,997 A | 12/1980 | Chraplyvy | 356/309 |
| 4,752,129 A * | 6/1988 | Izumi et al. | 356/328 |
| 5,357,336 A | 10/1994 | Ruhl et al. | 356/319 |
| 5,565,983 A | 10/1996 | Barnard | 356/328 |
| 5,859,702 A | 1/1999 | Lindblom | 356/305 |
| 5,991,324 A | 11/1999 | Knowles et al. | 372/57 |
| 6,151,112 A | 11/2000 | Atkinson et al. | 356/328 |

* cited by examiner

Primary Examiner—Frank G. Font
Assistant Examiner—Layla G. Lauchman
(74) Attorney, Agent, or Firm—William Cray

(57) ABSTRACT

A simple, reliable, easy to use method for calculating bandwidth data of very narrow band laser beams based on bandwidth data obtained with a spectrometer in circumstances where the laser bandwidths are not large compared to the slit function of the spectrometer. The slit function of the spectrometer is determined. Spectral data of the laser beam is measured with the spectrometer to produce a measured laser beam spectrum which represents a convolution of the laser beam spectrum and the spectrometer slit function. This measured laser spectrum is then mathematically convolved with the slit function of the spectrometer to produce a doubly convolved spectrum. Bandwidth values representing true laser bandwidths are determined from measured laser spectrum and the doubly convolved spectrum. Preferably the true laser bandwidths are calculated by determining the difference between "twice a measured laser bandwidth" and a corresponding "doubly convolved bandwidth". This method provides an excellent estimate of the true laser bandwidth because "twice the measured laser bandwidth" represents two laser bandwidths and two spectrometer slit function bandwidths and the "doubly convolved bandwidth" represents one laser bandwidth and two spectrometer slit function bandwidths. Thus, the difference is a representation of the true laser bandwidth. In a preferred embodiment the bandwidth parameters measured are the full width half-maximum bandwidth and the 95% integral bandwidth.

12 Claims, 5 Drawing Sheets

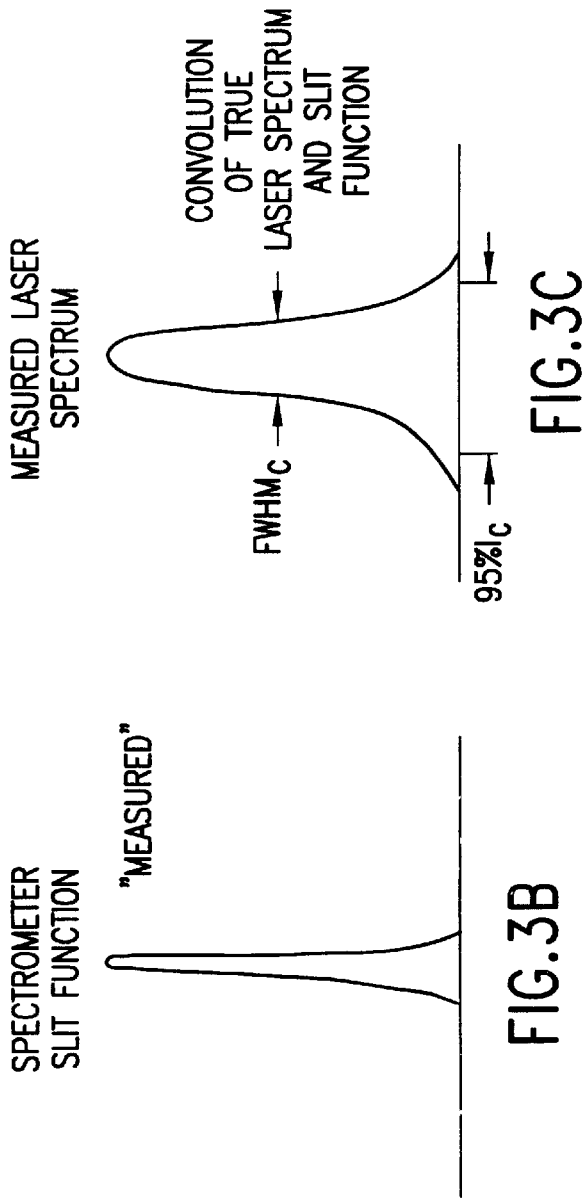
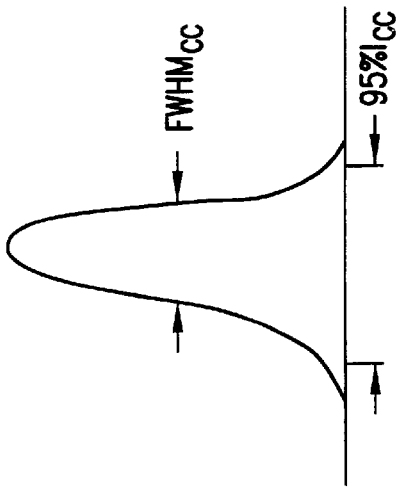
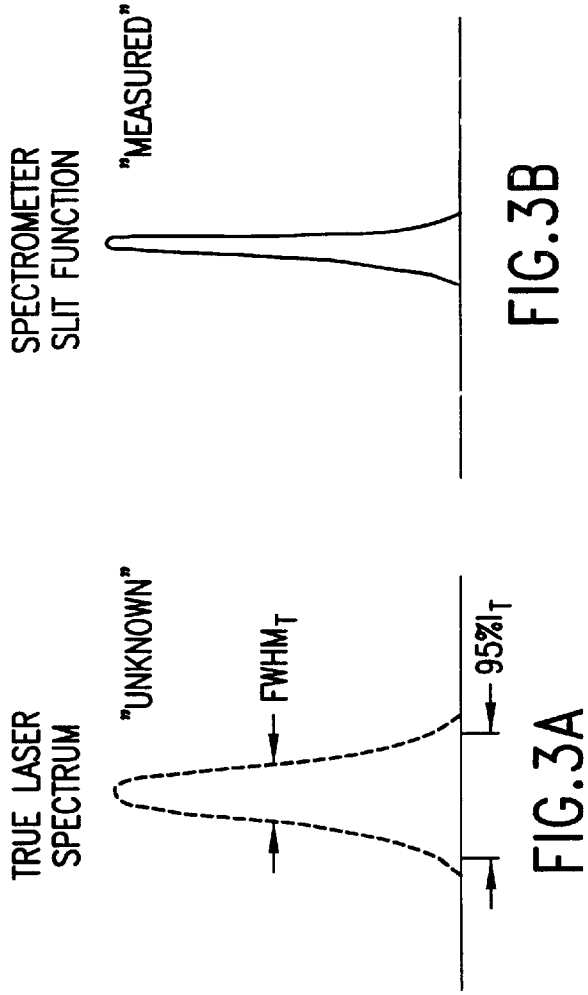

_US 6,603,549 B2_

CONVOLUTION METHOD FOR MEASURING LASER BANDWIDTH

This application is a continuation-in-part of U.S. Ser. No. 09/513,324, filed Feb. 25, 2000, now U.S. Pat. No. 6,320,663 entitled "Method and Device for Spectral Measurements of Laser Beam", U.S. Ser. No. 09/737,181, filed Dec. 14, 2000, now U.S. Pat. No. 6,359,693 entitled "Double Pass Double Etalon Spectrometer" and U.S. Ser. No. 09/772,293 filed Jan. 29, 2001, now U.S. Pat. No. 6,480,275 entitled "High Resolution Etalon-Grating Monochromator", all of which are incorporated herein by reference. This invention relates to spectrometers and especially to spectrometers for measuring bandwidths of narrow-band laser beams.

BACKGROUND OF THE INVENTION

Spectrometers are well known devices for measuring the spectra of laser beams (i.e., the intensity of light in the beam as a function of wavelength). Ultraviolet laser light sources used for modem integrated circuit lithography are required to have very narrow bandwidth and operate within tight bandwidth specifications. Spectrometers used to measure the spectra of these lasers can be divided into two main categories: diffraction grating based spectrometers and Fabri-Perot etalon based spectrometers.

A description of a typical KrF excimer laser used for lithography is provided in U.S. Pat. No. 5,991,324 which is incorporated herein by reference. There are two spectral bandwidth characteristics of these lasers which are referred to extensively in microlithography applications. These are the spectral bandwidth of the laser measured at 50 percent of the peak intensity, called its full width at half maximum bandwidth (abbreviated FWHM), and the spectral bandwidth, which contains 95% of laser energy called the 95% integral bandwidth (abbreviated 95% I). It is very important that the laser is always operating within specifications during microlithography chip manufacturing because spectral broadening causes blurring of the integrated circuit features being printed on silicon wafers which would result in yield problems. Therefore, it is very important to provide continuous accurate monitoring capabilities for the laser spectrum.

A measure of the quality of a spectrometer is its slit function. This is the spectrum which is recorded by the spectrometer when measuring a very very narrow spectrum. For a spectrometer to accurately measure the spectrum of a laser beam, the slit function bandwidth of the spectrometer itself should be substantially smaller than the laser bandwidth.

The nominal wavelength of a KrF laser is in the range of about 248 nm and the nominal wavelength of an ArF laser is in the range of about 193 nm. Current KrF and ArF lithography lasers operate at very narrow bandwidths within these ranges; with FWHM bandwidths of about 0.4 pm to 0.6 pm and with 95% I bandwidths of about 1.5 pm. A very good grating spectrometer such as the ELIAS model Echelle spectrometer supplied by Lasertechnik Berlin has a slit function with FWHM bandwidth in the range of about 0.14 pm and an 95% I bandwidth in the range of about 0.54 pm. (This slit function was measured using as a very very narrow spectrum a frequency doubled beam of an argon ion laser at a normal wavelength of about 248.25. The FWHM bandwidth of the frequency doubled line is about 0.04 pm.) Obviously, the slit function values of this spectrometer are somewhat smaller but not substantially smaller than the bandwidths being measured. The result is that the measured laser spectrum is not a true spectrum of the laser beam but a convolution of the laser beam spectrum and the slit function spectrum of the spectrometer. Deconvolution techniques are available in the prior art which utilize Fourier transforms to deconvolve the measured spectrum; however, available formal deconvolution algorithms are difficult to use and often lead to poor results especially for the 95% I values because the data at the outer wings of the spectra are subject to wide statistical variations.

What is needed is a spectrometer, capable of producing good FWHM and 95% I data and a simple, accurate, and easy to use method for using these measured data to calculate accurate, consistent and reliable bandwidth data.

SUMMARY OF THE INVENTION

The present invention provides a simple, reliable, easy to use method for calculating bandwidth data of very narrow band laser beams based on bandwidth data obtained with a spectrometer in circumstances where the laser bandwidths are not large compared to the slit function of the spectrometer.

The slit function of the spectrometer is determined. Spectral data of the laser beam are measured with the spectrometer to produce a measured laser beam spectrum which represents a convolution of the laser beam spectrum and the spectrometer slit function. This measured laser spectrum is then mathematically convolved with the slit function of the spectrometer to produce a doubly convolved spectrum. Bandwidth values representing true laser bandwidths are determined from measured laser spectrum and the doubly convolved spectrum.

Preferably the true laser bandwidths are calculated by determining the difference between "twice a measured laser bandwidth" and a corresponding "doubly convolved bandwidth". This method provides an excellent estimate of the true laser bandwidth because "twice the measured laser bandwidth" represents two laser bandwidths and two spectrometer slit function bandwidths and the "doubly convolved bandwidth" represents one laser bandwidth and two spectrometer slit function bandwidths. Thus, the difference is a representation of the true laser bandwidth.

In a preferred embodiment the bandwidth parameters measured are the full width half-maximum bandwidth and the 95% integral bandwidth.

BRIEF DESCRIPTION OF THE DRAWINGS

FIGS. 3A, B, C and D show various spectra important in the practice of a preferred embodiment of the present invention.

DETAILED DESCRIPTION OF PREFERRED EMBODIMENTS

A preferred embodiment of the present invention may be described by reference to the drawings.

Equipment

This first preferred embodiment is preferably used to measure the bandwidths of a lithography gas discharge laser such as a line narrowed KrF laser, a line narrowed ArF laser or an $F_2$ laser. A preferred spectrometer is a grating spectrometer known as the ELIAS spectrometer (an acronym for Emission Line Analyzing Spectrometer) which is supplied by Lasertechnik Berlin—GmbH with offices in Berlin, Germany. Preferably a personal computer running with Windows NT and a special algorithm described herein is used to calculate bandwidth parameters.

Method

Figure 1:
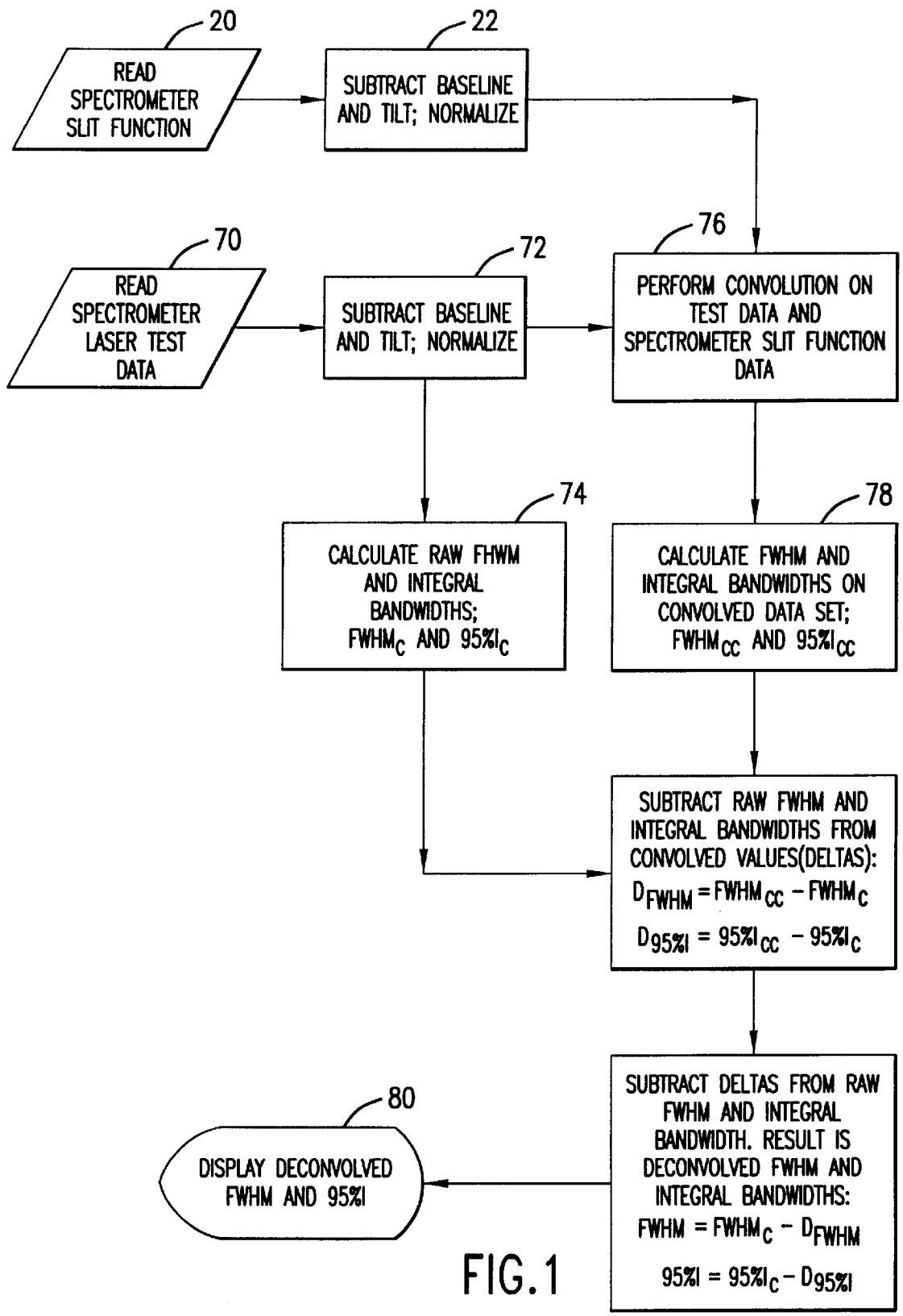
FIG. 1 is a flow chart showing the principal steps for practicing a preferred embodiment of the present invention.

The important steps for making bandwidth measurements as shown in FIG. 1 and are described as follows:

(1) Slit Function

As shown at 20 and 22, prior to calculating laser bandwidths, the slit function of the spectrometer is measured. Preferably, this is done by measuring a spectrum with substantially zero bandwidth. A preferred very very narrow band source is a frequency doubled argon-ion laser as available from suppliers, such as Coherent, Inc. which produces a normal wavelength in the range of the KrF wavelength and has a bandwidth of only about 0.04 pm. Background noise is subtracted and the slit function is normalized. The slit function is stored in the directory of a computer program written to make spectrum calculations as described below.

(2) Bandwidth Measurements

Figure 2A:
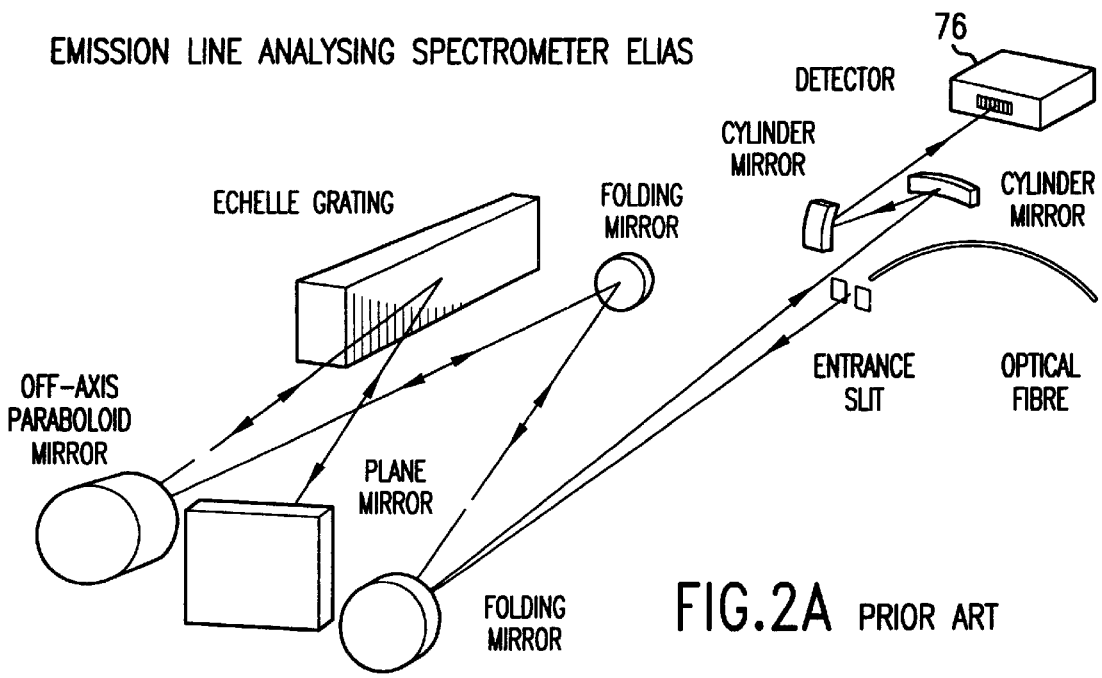
FIG. 2A is a drawing showing the principal components of a prior art spectrometer.
Figure 2B:
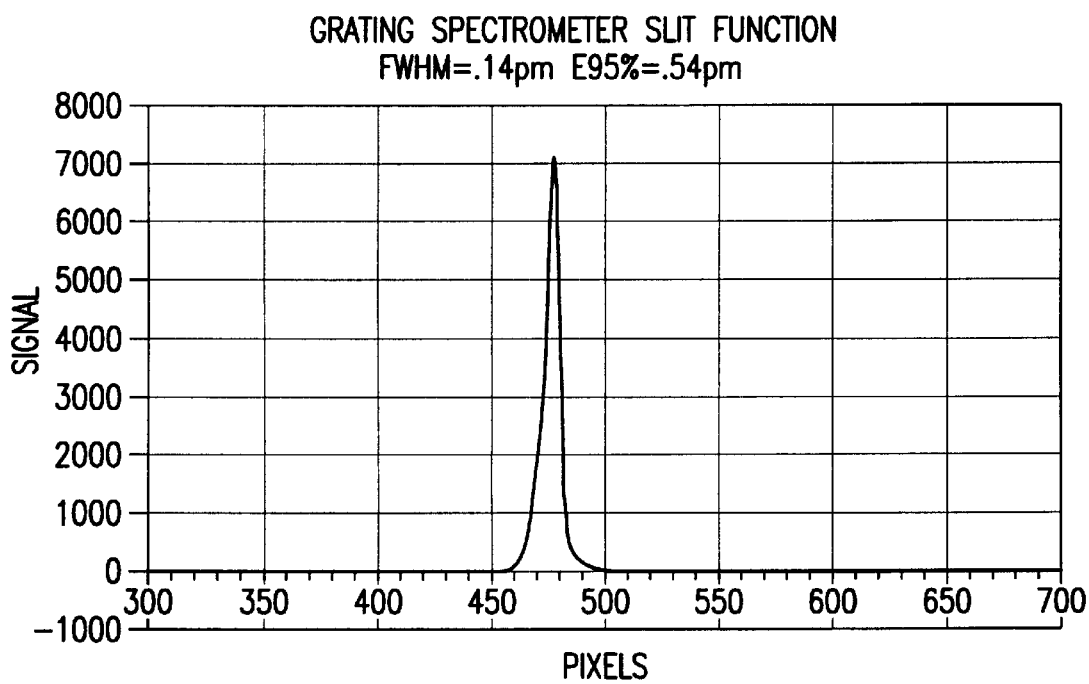
FIG. 2B is a graph of the slit function of a prior art diffraction grating spectrometer.

Bandwidth measurements are made as follows:

(A) A small portion, such as about 4%, of a beam being analyzed is extracted using a beam splitter and a portion of the extracted beam is collected into an optical fiber. This light is analyzed using the ELIAS spectrometer. FIG. 2A is a drawing (provided by the spectrometer supplier) of the components of the spectrometer. The supplier's description of the functioning of the spectrometer referring to the FIG. 2A drawing is as follows:

To be able to use theoretical resolution capability of the Echelle grating, the optical system of the spectrometer must meet two requirements. First, a nearly diffraction limited imaging has to be achieved. Second, the linear dispersion must be sufficiently high, in order to be able to scan the diffraction limited image of the entrance slit with 5–10 pixel considering that the typical pixel width of linear arrays is approximately 25 μm.

In the ELIAS, the 360 mm wide Echelle grating within a Littrow arrangement can be used alternatively in the double or single pass.

This makes it possible—motor-controlled by the software—to work either with an extremely highly resolving capability for profile characterization or with a reduced resolving capability but larger inspection range and higher signal-to-noise-ratio for the wavelength calibration.

The resulting camera focal distance of 10 m of the ELIAS is attained by a 2.5 m off-axis paraboloid and the following anarmophotic magnification optics with a tangential image reproduction scale of 4:1.

By using only two folding mirrors in the collimating Littrow-beam, this concept leads to a compact, thermally and mechanically extremely stable system.

By exclusively applying reflection optics with broadband UV layers, chromatic aberrations are avoided and there are no limitations in choosing the measurement wavelengths.

The coupling of the radiation into the spectrometer can be realized via a SMA fibre-optic interface or—in case that there is a risk of a too high beam intensity on the fibre—via a reflection transfer optics with a diffuser at the front end of the instrument.

The output of the spectrometer is a set of photodiode array spectral intensity data collected by detector 76 as shown in FIG. 2A. This data is fed directly to the PC.

(3) Algorithm

The PC is preferably programmed with an algorithm designed to accomplish the items shown in FIG. 1. For each spectral measurement the laser test data is read as indicated at 70. Background is subtracted and the data is normalized as indicated at 72 to produce a normalized measured laser spectrum. FWHM and 95% integral bandwidths are calculated from the raw spectral data indicated at 74. These values contain bandwidth contributions from both the laser and the spectrometer and are identified as $FWHM_c$ and 95% $I_c$ referring to the fact that the spectrum represents single convolution of beam spectrum and slit function. As shown at 76 the computer them performs a convolution of the normalized (singly convolved) measured spectrum with the measured normalized slit function to produce a doubly convolved laser beam spectrum. From this doubly convolved laser beam spectrum the computer calculates FWHM and 95% integral values as shown at 78 to produce $FWHM_{cc}$ and 95% $I_{cc}$ (the subscripted cc's refer to the fact that the spectra is doubly convolved). Next the computer subtracts the singly convolved bandwidth values from the doubly convolved values to obtain ΔFWHM and Δ95% I values. These Δ values are then subtracted from the singly convolved values to obtain a best estimate of the deconvolved values of FWHM and 95% integral of the laser beam, all as shown in FIG. 1. The results are displayed as shown at 80. The reader should note that the same result is obtained by subtracting $FWHM_{cc}$ from twice $FWHM_c$ and by subtracting 95% $I_{cc}$ from twice 95% $I_c$:

LASER $FWHM=2(FWHM_c)-(FWHM_{cc})$ and

LASER 95% $I=2(95\% I_c)-(95\% I_{cc})$.

FIGS. 3A, B, C and D respectively depict: 3A the unknown laser spectrum 3B the measured slit function, 3C the measured laser spectrum which is a convolution of the unknown laser spectrum and the measured slit function and 3D the calculated convolution of the measured laser spectrum and the spectrometer slit function. Values of $FWHM_T$ and 95% $I_T$ (T stands for true bandwidth), $FWHM_c$, 95% $I_c$, $FWHM_{cc}$ and 95% $I_{cc}$ are indicated on the figures.

This technique provides an excellent estimate of the true laser bandwidth. The reader should understand that the result is an estimate of the "true" laser bandwidth. How close the estimate is to true bandwidth values depends on the shape of the spectrum. If the laser spectrum and the slit function are both Lorentzian, the bandwidth estimates are equal to the true bandwidths. For a Gaussian spectra, the estimates obtained using the above technique typically differ from the true bandwidth values by much less than 1%. For example, if the true bandwidth were 0.3873 pm and the slit function were 0.1 pm. Applicants' technique would estimate a bandwidth of 0.3877 pm (i.e., a conservative error of about 0.1 percent). A practical explanation as to why this technique works is that "twice the measured laser bandwidth" represents two laser bandwidths and two spectrometer slit function bandwidths and the "doubly convolved bandwidth" represents one laser bandwidth and two spectrometer slit function bandwidths.

Cross Check

As a further proof of the value of the above described technique, Applicants have compared the results of the above-described technique with the results of formal deconvolutions obtained using a prior art formal FFT deconvolution technique using nineteen sets of actual spectrometer data collected by analyzing ArF laser beams. These results are displayed in Table I.

TABLE I

Comparison of Forward Deconvolution and Formal (FFT) Deconvolution

| Raw Data | | Forward Deconvolution | | Formal (FFT) Deconvolution | |
|---|---|---|---|---|---|
| FWHM | 95% I | FWHM | 95% I | FWHM | 95% I |
| 0.374 | 1.171 | 0.337 | 0.967 | 0.349 | 0.996 |
| 0.382 | 1.144 | 0.349 | 0.951 | 0.347 | 1.09 |
| 0.394 | 1.203 | 0.358 | 1.016 | 0.368 | 1.049 |
| 0.377 | 1.143 | 0.342 | 0.972 | 0.352 | 1.006 |
| 0.423 | 1.18 | 0.391 | 1.013 | 0.398 | 1.127 |
| 0.378 | 1.141 | 0.344 | 0.961 | 0.352 | 1.005 |
| 0.399 | 1.153 | 0.361 | 0.978 | 0.382 | 1.065 |
| 0.387 | 1.149 | 0.352 | 0.973 | 0.36 | 1.03 |
| 0.406 | 1.236 | 0.358 | 0.999 | 0.304 | 1.048 |
| 0.447 | 1.233 | 0.404 | 1.007 | 0.334 | 1.16 |
| 0.487 | 1.231 | 0.447 | 1.006 | 0.389 | 1.11 |
| 0.439 | 1.344 | 0.387 | 1.12 | 0.36 | 1.135 |
| 0.377 | 1.021 | 0.327 | 0.789 | 0.255 | 0.983 |
| 0.563 | 1.26 | 0.534 | 1.06 | 0.502 | 1.232 |
| 0.543 | 1.232 | 0.499 | 1.038 | 0.506 | 1.194 |
| 0.354 | 1.005 | 0.304 | 0.779 | 0.266 | 0.884 |
| 0.439 | 0.971 | 0.399 | 0.758 | 0.401 | 0.867 |
| 0.507 | 1.148 | 0.468 | 0.954 | 0.441 | 0.954 |
| 0.34 | 0.982 | 0.287 | 0.757 | 0.222 | 0.731 |

This table includes FWHM and 95% I bandwidth values obtained from raw data which as stated above represent a convolution of the true laser beam bandwidth and the slit function of the spectrometer. The third and fourth columns are the results of applying the techniques of the preferred embodiment of the present invention as described above. The fifth and sixth columns are the results of the formal FFT deconvolutions.

About three days were required by one of the Applicants to do the formal FFT deconvolution because of the difficulty of finding good fits of the test data to known curve shapes. The columns 2 and 3 results are produced almost instantaneously. The comparison of the Table I data shows that the technique of the present invention produces results which are typically within about 10% of the values laboriously obtained with the formal deconvolution methods.

95 Percent Integral Bandwidth

Figure 4A:
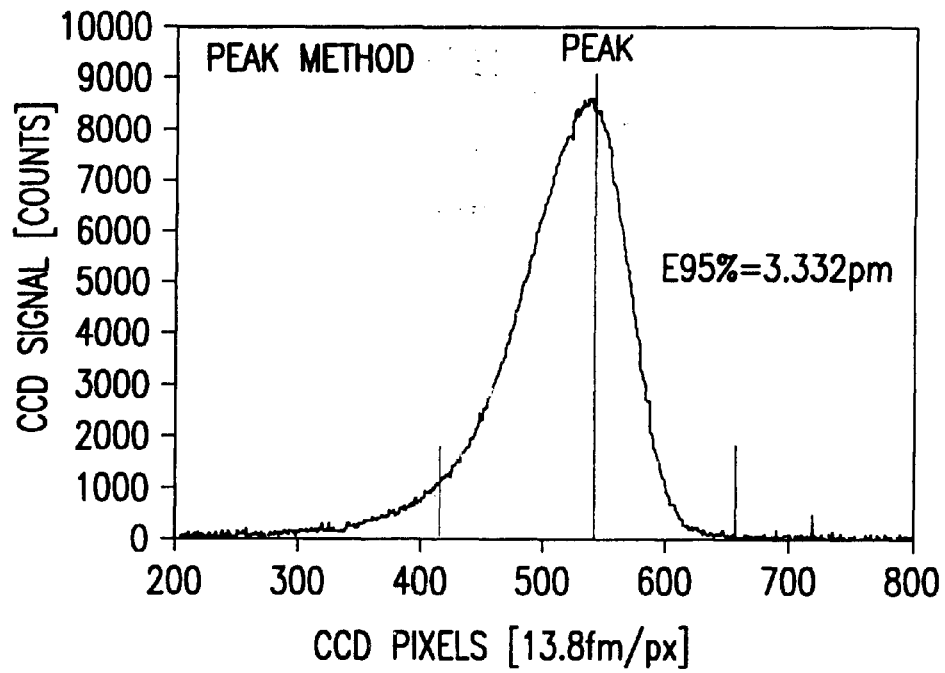
FIGS. 4A, B, C and D describe various definitions of the 95% I bandwidth.
Figure 4B:
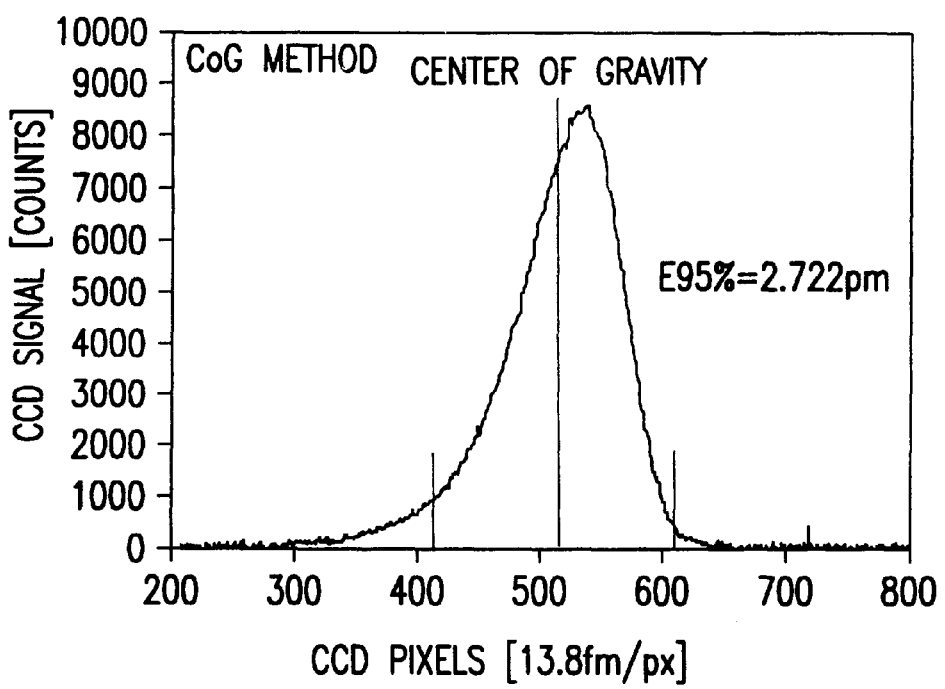
Figure 4C:
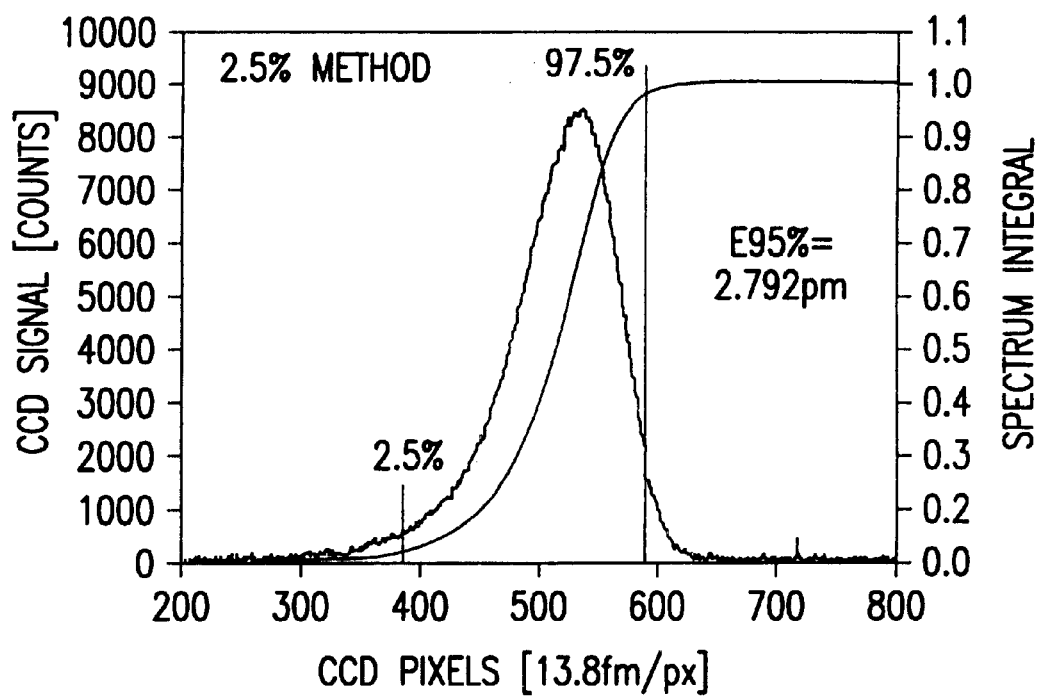
Figure 4D:
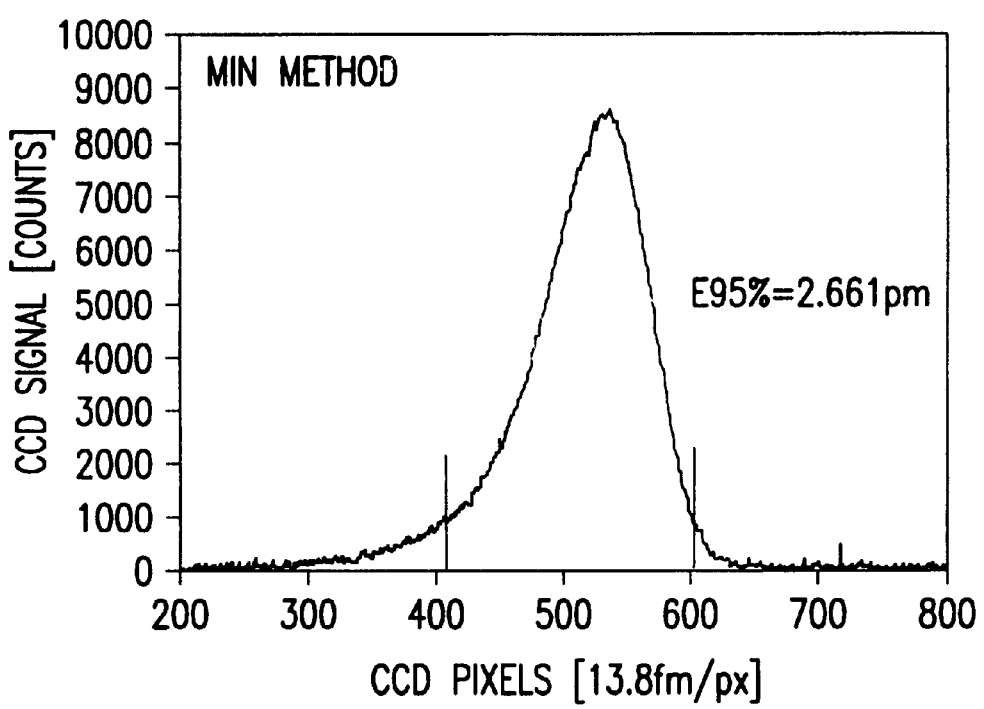

Applicants have referred to the 95 percent integral bandwidth above but have not defined it. This parameter is extensively used as a spectra defining parameter but there is not a single universally used precise definition. There is general agreement that it represents a spectral width within which 95 percent of the energy of the light being analyzed is located. There are four precise definitions of 95% I which could be utilized. These are described below with respect to FIGS. 4A, B, C and D:

1) 95% I (Peak) In this definition, portrayed in FIG. 4A, one starts at the intensity peak and symmetrically opens a window to both sides until 95% of the total energy is contained in the window. This is the definition used by the maker of the ELIAS spectrometer.
2) 95% I (CoG) This definition is very similar to E95 (peak), but one first calculates the center of gravity of the spectrum and then expands the window centered around CoG. This definition is preferred by one of the leading producers of lithography equipment.
3) 95% I (2.5%) In this definition portrayed in FIG. 4C, one measures the distance between the 2.5% and 97.5% points in the spectrum integral. This is the definition preferred by Applicants.
4) 95% I (Min) Finally, as displayed in FIG. 4D, one can scan through all possible windows containing 95% of the energy and select the narrowest one.

Any of the above definitions of 95% I could be used in the practice of the present invention. As stated above, applicants prefer the definition referred to as 95% I (2.5%).

Various modifications may be made to the invention without altering its scope. All of the above are just examples of the present invention. Those skilled in the art will readily recognize that numerous other modifications and alterations may be made without departing from the spirit and scope of the invention. Preferably one set of noise data is measured for each set of pulse data and the noise data is used to correct the pulse data. However, other variations of this one for one technique could be used. For example, one set of noise data could be used to correct several (such as 10) sets of pulse data. Since there is normally substantial randomness in noise data, there could be advantages in using a running average of several (such as 10) sets of noise data to correct each set of pulse data. This approach would be useful if experiments showed that random variations in the noise was greater than the temporal variation in this noise. Accordingly, the above disclosure is not intended to be limiting and the scope of the invention is to be determined by the appended claims.

I claim:

1. A method for using a spectrometer defining a slit function to make bandwidth measurements of a light source having bandwidths which are not large compared to corresponding bandwidths of the spectrometer slit function, said method comprising the steps of:

A) determining the spectrometer slit function;
   B) storing a digital representation of the slit function in a digital computer processor;
   C) using a spectrometer to make a spectral measurement of said light source to determine a measured spectrum representing a convolution of a true source spectrum and said slit function;
   D) determining at least one bandwidth of said measured spectrum to obtain at least one measured bandwidth;
   E) using said computer processor to perform a convolution of said measured spectrum and said slit function to produce a doubly convolved spectrum representing the true source spectrum and two split functions, and determining at least one bandwidth of said doubly convolved spectrum;
   F) estimating at least one bandwidth value of said light source using said at least one bandwidth determined from said doubly convolved spectrum and said at least one measured bandwidth determined from said measured spectrum.

2. A method as in claim 1 wherein said estimate is made by subtracting said at least one measured bandwidth of said measured spectrum from said at least one bandwidth of said doubly convolved spectrum to obtain at least one delta bandwidth then subtracting the at least one delta bandwidth from said at least one measured spectrum.

3. A method as in claim 1 wherein said estimate is made by multiplying the at least one measured bandwidth obtained from said measured spectrum by two and subtracting from the result the at least one bandwidth determined from the doubly convolved spectrum.

4. A method as in claim 1 wherein said at least one measured bandwidth determined from said measured spectrum and said at least one bandwidth determined from said doubly convolved spectrum each comprises a FWHM bandwidth.

5. A method as in claim 2 wherein said at least one measured bandwidth determined from said measured spectrum and said at least one bandwidth determined from said doubly convolved spectrum each comprises a FWHM bandwidth.

6. A method as in claim 3 wherein said at least one measured bandwidth determined from said measured spectrum and said at least one bandwidth determined from said doubly convolved spectrum each comprises a FWHM bandwidth.

7. A method as in claim 1 wherein said at least one measured bandwidth determined from said measured spectrum and said at least one bandwidth determined from said doubly convolved spectrum each comprises a 95% I bandwidth.

8. A method as in claim 2 wherein said at least one measured bandwidth determined from said measured spectrum and said at least one bandwidth determined from said doubly convolved spectrum each comprises a 95% I bandwidth.

9. A method as in claim 3 wherein said at least one measured bandwidth determined from said measured spectrum and said at least one bandwidth determined from said doubly convolved spectrum each comprises a 95% I bandwidth.

10. A method as in claim 1 wherein said at least one measured bandwidth determined from said measured spectrum and said at least one bandwidth determined from said doubly convolved spectrum each comprises at least two bandwidths comprising a FWHM bandwidth and a 95% I bandwidth.

11. A method as in claim 2 wherein said at least one measured bandwidth determined from said measured spectrum and said at least one bandwidth determined from said doubly convolved spectrum each comprises at least two bandwidths comprising a FWHM bandwidth and a 95% I bandwidth.

12. A method as in claim 3 wherein said at least one measured bandwidth determined from said measured spectrum and said at least one bandwidth determined from said doubly convolved spectrum each comprises at least two bandwidths comprising a FWHM bandwidth and a 95% I bandwidth.

* * * * *

UNITED STATES PATENT AND TRADEMARK OFFICE
CERTIFICATE OF CORRECTION

PATENT NO. : 6,603,549 B2
DATED : August 5, 2003
INVENTOR(S) : Haas et al.

It is certified that error appears in the above-identified patent and that said Letters Patent is hereby corrected as shown below:

Column 1,
Line 21, change "modem" to -- modern --.

Column 6,
Line 49, change "split" to -- slit --.

Signed and Sealed this

Sixth Day of June, 2006

JON W. DUDAS
*Director of the United States Patent and Trademark Office*